(12) United States Patent
Kobayashi et al.

(10) Patent No.: US 6,676,793 B2
(45) Date of Patent: Jan. 13, 2004

(54) METHOD AND APPARATUS FOR MANUFACTURING LAMINATED MATERIAL

(75) Inventors: Akira Kobayashi, Kanagawa-ken (JP); Kouji Yamada, Kanagawa-ken (JP); Hideo Kurashima, Kanagawa-ken (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 13 days.

(21) Appl. No.: 10/052,574

(22) Filed: Jan. 23, 2002

(65) Prior Publication Data

US 2002/0166637 A1 Nov. 14, 2002

(30) Foreign Application Priority Data

Jan. 29, 2001 (JP) ........................................ 2001-020828
Nov. 15, 2001 (JP) ........................................ 2001-350772

(51) Int. Cl.$^7$ .............................................. B32B 31/00
(52) U.S. Cl. .................. 156/244.11; 156/257; 156/498; 156/501; 156/517; 156/555; 156/582
(58) Field of Search ............................ 156/244.11, 250, 156/257, 308.2, 498, 500, 501, 510, 516, 517, 555, 580, 582, 583.1

(56) References Cited

U.S. PATENT DOCUMENTS 5,387,303 A * 2/1995 Azuma ........................ 156/179
5,679,200 A * 10/1997 Newcomb et al. ........ 156/308.2
5,695,579 A * 12/1997 Rowland ...................... 156/64
5,840,152 A * 11/1998 Billgren et al. ............. 156/498

* cited by examiner

*Primary Examiner*—James Sells
(74) *Attorney, Agent, or Firm*—Browdy and Neimark, P.L.L.C.

(57) ABSTRACT

The present invention provides a method for manufacturing laminated material which can remove ear portions of a resin film extruded from an extruding machine and can directly laminate the resin film to a substrate and can make the processing of end portions of a laminated material after lamination unnecessary. The present invention also provides an apparatus used for such a manufacturing method. In the method for manufacturing laminated material which laminates a resin film formed by extruding molten thermoplastic resin from a T-die to a substrate, a laminating film is formed by cutting ear portions of the resin film before lamination and the laminating film is laminated to the substrate. Further, the apparatus for manufacturing laminated material according to the present invention comprises heating means which preheats a substrate, a T-die which extrudes molten thermoplastic resin as a resin film, cutting means which forms a laminating film by cutting ear portions of the resin film before lamination, lamination rolls which laminate the laminating film to the substrate, and a cooling device which quenches the formed laminated material.

23 Claims, 9 Drawing Sheets

METHOD AND APPARATUS FOR MANUFACTURING LAMINATED MATERIAL

BACKGROUND OF THE INVENTION

1. Field of the Invention

The present invention relates to a method for manufacturing laminated material coated with thermoplastic resin and an apparatus for manufacturing such laminated material, and more particularly, to a method for manufacturing laminated material which is used as material for can, material for construction, material for automobile interior, material for electric appliances, material for furniture and the like and an apparatus for manufacturing such laminated material.

2. Description of the Related Art

Conventionally, to enable a metal sheet which constitutes a substrate to have the corrosion resistance, a laminated material which is formed by laminating a resin film to a metal sheet has been widely known.

As a method for manufacturing such laminated material, a method which coats a material which is produced by dispersing epoxy resin-based thermosetting resin, phenol resin-based thermosetting resin, acrylic resin-based thermosetting resin, polyester resin-based thermosetting resin into a solvent to a surface of the substrate, a method which laminates a preformed film such as a polyester-based film, an olefin resin-based film, a polyamide-based film to a substrate using an isocyanate-based adhesive agent, an epoxy-based adhesive agent or a phenol-based adhesive agent, and the like have been known.

Further, there has been also known a method in which a substrate and thermoplastic resin are laminated by making use of the heat adhesion ability of the thermoplastic resin. As such a method, there has been known a method which adheres a preformed film made of thermoplastic polyester to a metal sheet by heat or a method which adheres a resin film made of extruded thermoplastic polyester resin to a substrate by heat.

Among these methods, as the method which adheres the resin film made of the extruded thermoplastic resin to the substrate by heat, following techniques have been disclosed.

For example, in International Patent Publication 503378/1999, a method which coats resin on both surfaces of a metal strip while extruding the resin and forming films is disclosed. In the method, the metal strip made of aluminum alloy, for example, is moved through a provisional conditioner, two sets of extruding dies, a post heating machine and a cooling system thus coating the both surfaces of the strip with thin polyester material coatings. In an apparatus shown in FIG. 1 of the specification of this publication, thin films made of polyester which are extruded from the dies are stretched to be made thin by first rolls (stretching rolls), are cooled by second rolls (rolling contact rolls) and are adhered to the heated metal strip under pressure using third rolls (lamination rolls).

Further, Japanese Laid-open Patent Publication 138315/1998 discloses a method for manufacturing resin/metal laminated material. In such a method which forms a resin coating or film on at least one of surfaces of a metal substrate, along a path of the metal substrate, a region in which the metal substrate is heated, a die which supplies thermoplastic resin in a film form, a pair of hot lamination rolls which make the thermoplastic resin adhered to at least one of surfaces of the metal substrate and quenching means for quenching the formed laminated material are arranged. Further, the resin film made of thermoplastic resin which is supplied from the die is supported and transported by warm laminate rolls corresponding to the resin film so that the resin film is supplied to a nip position between the warm laminate rolls whereby the thin film made of thermoplastic resin is adhered by melting to at least one of surfaces of the heated metal substrate by the warm laminate rolls.

Further, Japanese Laid-open Patent Publication 80935/1995 and Japanese Laid-open Patent Publication 80936/1995 and the like propose a following method as a method which manufactures a laminated metal sheet by coating resin films extruded from T-dies to the metal sheet. That is, in the manufacturing method of the laminated metal sheet, at the time of allowing molten thermoplastic resin to be pressed by a pair of rolls and to flow down to an interface of one surface of the metal sheet and one of a pair of rolls from the T-die, the metal sheet is preheated such that the preheated temperature of a center portion of the metal sheet is set higher than the preheated temperature of end portions of the metal sheet and, thereafter, the molten thermoplastic resin is allowed to flow such that the thermoplastic resin is coated and adhered to one surface of the metal sheet temporarily, and the end portions of the formed thermoplastic resin film are removed, and then at least end portions of the obtained thermoplastic resin-coated metal sheet is heated again.

However, when the resin film is extruded from the T-die using such a method, both end portions (ear portions) of the resin film are contracted in the course of solidification by cooling so that a so-called neck-in phenomenon which makes both end portions of the resin film thick tends to occur whereby a laminating film obtained after solidification by cooling becomes a laminating film whose thickness at both end portions (ear portions) in the widthwise direction become thicker than the thickness at other portions. When the laminating film which has such thick ear portions is directly laminated to the substrate, a laminated material which has the substrate coated with the laminating film having different thickness in the widthwise direction is formed. Accordingly, usually, after solidification by cooling, the ear portions are cut (trimmed) by approximately 30 to 50 mm and, thereafter, the laminated material is wound by a winding machine. Then, the laminating film having the uniform thickness and the substrate are laminated.

Further, in the method disclosed in the above-mentioned Japanese Laid-open Patent Publication 80935/1995, Japanese Laid-open Patent Publication 80936/1995 and the like, it is necessary to cut and remove the ear portions together with the substrate after the lamination and the trimmed ear portions constitute composite materials made of the ear portions and the substrate so that this also gives rise to a problem with respect to the disposal of scraps.

Further, in the manufacturing of the laminated material which is used as can material, the can forming requires a strong working so that there also arises a technical problem that a thin laminating film must be firmly adhered to the substrate such as a metal sheet while ensuring the uniform thickness.

The present invention has been made in view of the above-mentioned problems of the related art and it is an object of the present invention to provide a method for manufacturing laminated material which can remove ear portions of a resin film extruded from an extruding machine, can directly laminate the resin film to the substrate and can also make the disposal of end portions of the laminated material after lamination unnecessary and to provide a manufacturing apparatus which can be used in such a manufacturing method.

It is still another object of the present invention to provide a method for manufacturing resin laminated material which can prevent the softening of metal by heating and the thermal modification and thermal oxidation of resin as much as possible and exhibits the remarkably excellent adhesiveness of the resin film to a substrate while ensuring a uniform laminating film thickness with high productivity and high product yields.

It is a further object of the present invention to provide a method for manufacturing laminated material in which the formed laminated material can withstand the working of large degree such as deep drawing working, bending and stretching working and ironing working and the formed body after working exhibits the excellent corrosion resistance whereby it is possible to provide a method for manufacturing laminated material useful for application to can material.

SUMMARY OF THE INVENTION

A method for manufacturing laminated material according to the present invention which laminates a resin film formed by extruding molten thermoplastic resin from a T-die to a substrate is characterized in that a laminating film is formed by cutting ear portions (lug portions) of the resin film before lamination and the laminating film is laminated to the substrate.

Further, a method for manufacturing laminated material according to the present invention which laminates a resin film formed by extruding molten thermoplastic resin from a T-die to a substrate is characterized in that the resin film is temporarily received and held by a pre-roll, then ear portions of the resin film are cut before lamination to form a laminating film, and the laminating film is laminated to the substrate.

Further, a method for manufacturing laminated material according to the present invention which laminates a resin film formed by extruding molten thermoplastic resin from a T-die to a substrate is characterized in that ear portions of the resin film are cut and a flattened portion is cut to form a plurality of strips made of laminating films before lamination, and a plurality of strips made of laminating films are laminated to the substrate.

In these methods for manufacturing laminated material, the thermoplastic resin is made of polyester and a temperature of the resin film at the time of cutting is preferably set to equal to or more than the glass transfer point (Tg).

An apparatus for manufacturing laminated material according to the present invention includes heating means which preheats a substrate, a T-die which extrudes molten thermoplastic resin as a resin film, cutting means which forms a laminating film by cutting ear portions of the resin film before lamination, lamination rolls which laminate the laminating film to the substrate, and a cooling device which quenches the formed laminated material.

Further, an apparatus for manufacturing laminated material according to the present invention includes heating means which preheats a substrate, a T-die which extrudes molten thermoplastic resin as a resin film, a pre-roll which temporarily receives the resin film which is extruded from the T-die, cutting means which forms a laminating film by cutting ear portions of the resin film before lamination, lamination roll which laminate the laminating film to the substrate, and a cooling device which quenches the formed laminated material.

Still further, an apparatus for manufacturing laminated material according to the present invention includes heating means which preheats a substrate, a T-die which extrudes molten thermoplastic resin as a resin film, cutting means which forms a plurality of strips of laminating films by cutting ear portions of the resin film and also by cutting flattened portion before lamination, lamination rolls which laminate a plurality of strips of laminating films to the substrate, and a cooling device which quenches the formed laminated material.

In these apparatuses for manufacturing the laminated material, the lamination roll is preferably formed of a lamination roll having stepped portions.

In these apparatuses for manufacturing the laminated material, the cutting means is preferably formed of laser beams.

In these apparatuses for manufacturing the laminated material, a laser beam device is disposed above the lamination rolls.

In these apparatuses for manufacturing the laminated material, a pair of T-dies and cutting means are arranged in substantially symmetry with respect to a surface of the substrate and the laminating films are laminated to both surfaces of the substrate.

DETAILED DESCRIPTION OF THE PREFERRED EMBODIMENTS

A method for manufacturing laminated material according to the present invention is explained hereinafter in conjunction with attached drawings.

Figure 1:
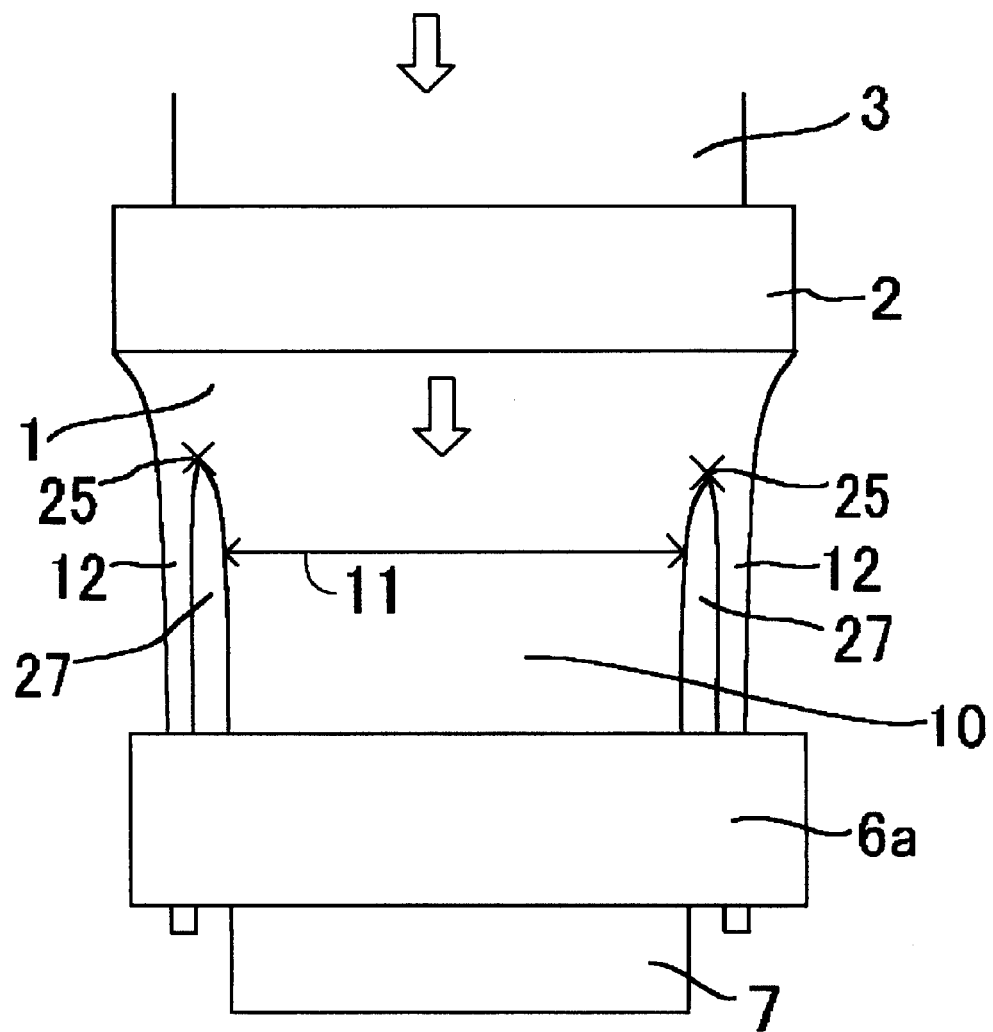
FIG. 1 is a schematic view showing a method for manufacturing laminated material according to the present invention.

In the method for manufacturing laminated material according to the present invention, as shown in FIG. 1, molten thermoplastic resin is extruded from a T-die 2 in a film form to form a resin film 1, ear portions (lug portions) 12 of the resin film 1 are cut at cutting positions 25 disposed in front of a position where a lamination of the extruded resin film 1 is performed before laminating the resin film 1 to a substrate 3 by using lamination rolls 6a, 6b thus forming a laminating film 10 having a flattened portion 11 of a fixed width, and the laminating film 10 is laminated to the substrate 3 whereby laminated material 7 which laminates the laminating film 10 having a uniform laminating thickness to the substrate 3 can be obtained.

Figure 2:
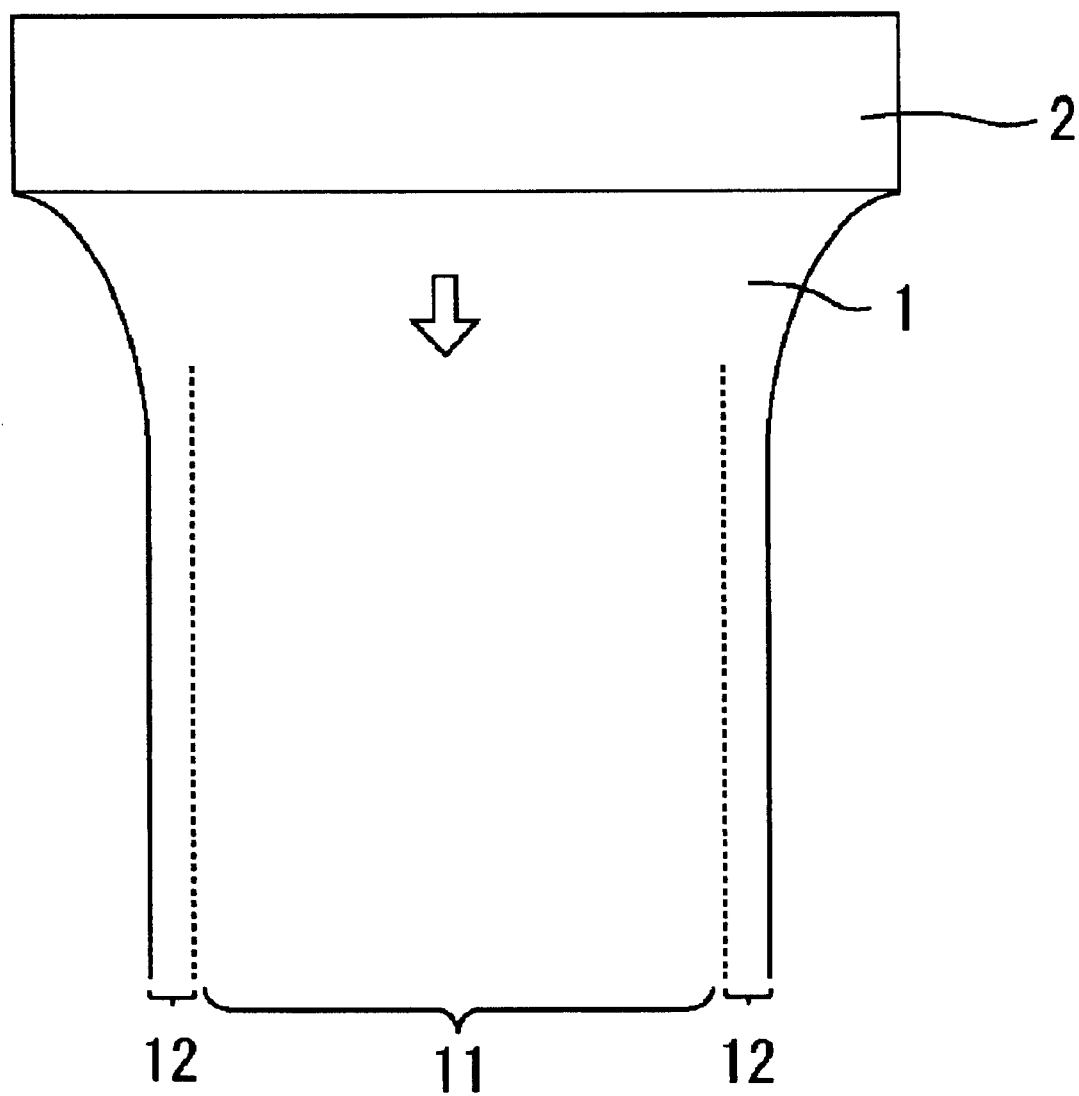
FIG. 2 is an explanatory view for showing a neck-in state of a resin film extruded from a T-die.

As shown in FIG. 2, in general, the resin film 1 which is excluded from the T-die 2 in a molten form, as mentioned previously, tends to generate a so-called neck-in phenomenon in which both end portions (ear portions 12) of the resin film 1 are contracted in the course of solidification by cooling. When this phenomenon is generated, both end portions (ear portions 12) of the cooled and solidified laminating film 10 in the widthwise direction have a thickness greater than a thickness of the flattened portion 11 which is present at the center portion of the laminating film in the widthwise direction and has the substantially fixed thickness. Further, both end portions extend in the longitudinal direction of the laminating film 10.

According to the present invention, as shown in FIG. 1, the ear portions 12 of the resin film 1 whose thickness is increased due to the generation of the neck-in phenomenon are cut at cutting positions 25 before lamination thus forming a laminating film 10 having only the flattened portion 11. Then, before the laminating film 10 is completely cooled and solidified, the laminating film 10 is laminated to the preheated substrate 3. Further, since the resin temperature at both end portions of the laminating film 10 after cutting has been already lowered to some extent, the increase of the thickness of both end portions due to the neck-in phenomenon is no more generated. Then, the uniform contraction force in the widthwise direction still remains in the laminating film 10 to some extent so that the cut openings 27 are widened whereby no thick portions are formed at both end portions of the laminating film 10 and the adhesion of the laminating film 10 with the ear portions 12 again can be prevented.

Figure 3:
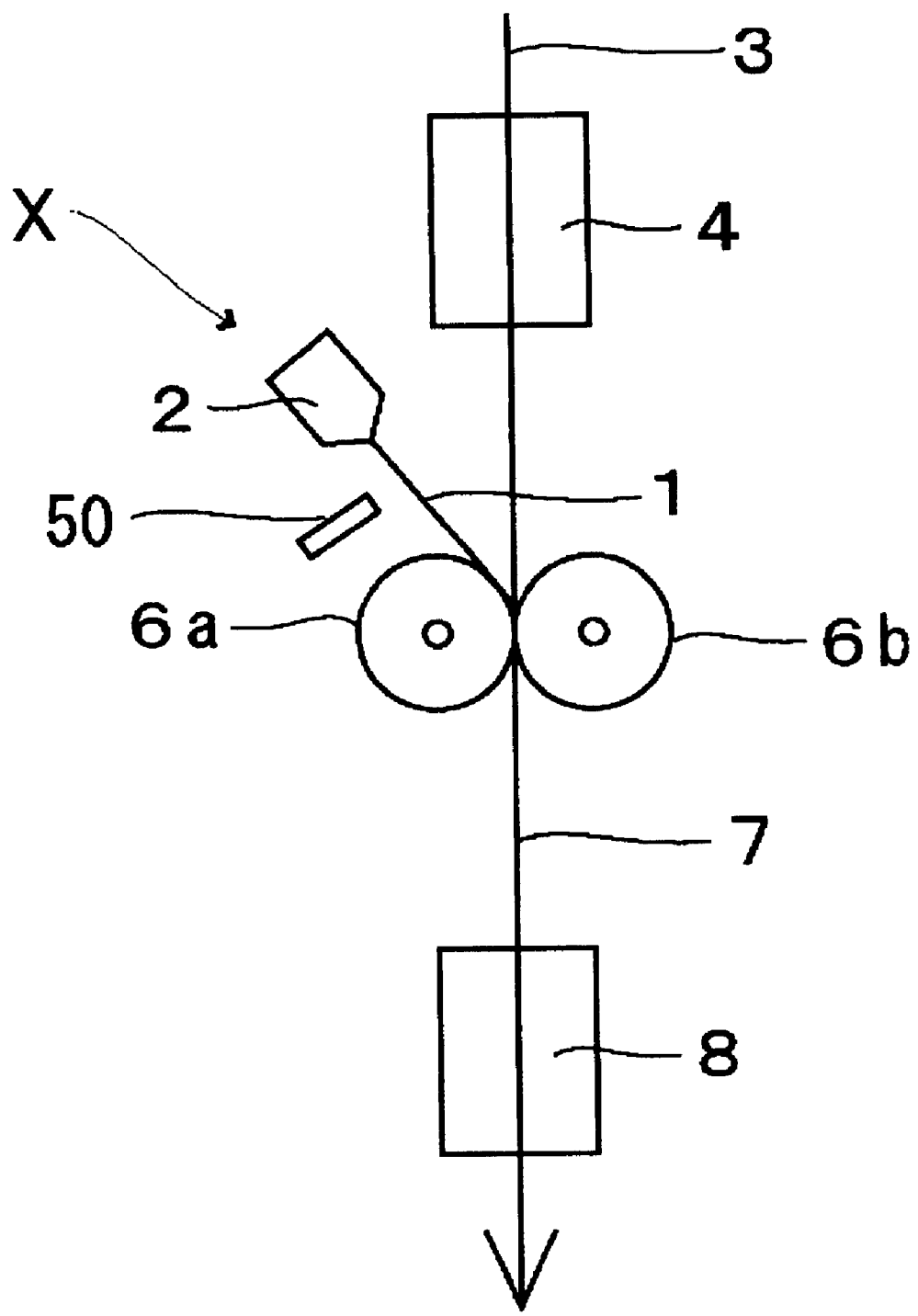
FIG. 3 is a schematic view showing an apparatus for manufacturing laminated material using the method for manufacturing laminated material according to the present invention.

FIG. 3 shows a general view of an apparatus X for manufacturing laminated material which is used in the method for manufacturing laminated material according to the present invention.

In FIG. 3, the apparatus X for manufacturing laminated material includes heating means 4 which preheats the substrate 3, the T-die 2 which extrudes molten plastic resin as a resin film 1, cutting means 50 which cuts the resin film 1 extruded from the T-die 2 at the cutting position 25 before lamination so as to form the laminating film 10, lamination rolls 6a, 6b which adhere the extruded resin film 1 to the substrate 3 by heat adhesion, and a cooling device 8 which quenches the formed laminated material 7.

[Substrate]

A metal substrate is preferably used as the substrate 3 used in the present invention. For example, metal material which can be used as can material for a vessel such as a beverage can, material for construction such as roof, wall, partition and the like, material for interior in an automobile, material electric appliance, material for furniture can be used as the substrate 3. For example, various kinds of surface processed steel sheets can be used. Among various kinds of surface processed steel sheets, a tin-free steel sheet, a galvanized steel sheet, a zinc-based alloy plated steel sheet, a tin plated steel sheet, a tin alloy plated steel sheet, an aluminum plated steel sheet, an aluminum alloy plated steel sheet, an aluminum laminated steel sheet, a stainless sheet and the like are named. Further, light metal sheets can be also used as the substrate 3. Among the light metal sheets, an aluminum metal sheet is preferably used as the substrate 3. Further, foils of the above-mentioned metal substrates can be preferably used. However, the present invention is not limited to the above-exemplified materials.

A preferred example of the surface processed steel sheet is an electrolytic chromatic acid processed steel sheet and particularly is such a sheet having 10 to 200 mg/m$^2$ of a metal chromium layer and 1 to 50 mg/m$^2$ (metal chromium conversion) of a chromium oxide layer. This electrolytic chromatic acid processed steel sheet exhibits the excellent laminating resin adhesion and the excellent corrosion resistance.

As another example of the surface processed steel sheet, a tin sheet having a tin plating quantity of 0.6 to 11.2 g/m$^2$ is named. It is preferable that chromic acid processing or chromic acid/phosphating processing is applied to the surface of the tin sheet such that the chromium quantity amounts to 1 to 30 mg/m$^2$ by metal chromium conversion.

As the light metal sheet, a pure aluminum sheet, an aluminum alloy sheet and the like can be used. The aluminum alloy sheet which exhibits the excellent corrosion resistance and the excellent workability has the composition consisting of Mn: 0.2 to 1.5 weight %, Mg: 0.8 to 5 weight %, Zn: 0.25 to 0.3 weight %, Cu: 0.16 to 0.26 weight % and Al as the balance.

It is also preferable that chromic acid processing or chromic acid/phosphating processing is applied to the surface of the light metal sheet such that the chromium quantity amounts to 20 to 300 mg/m$^2$ by metal chromium conversion.

Although the thickness of the metal substrate may differ depending on the kinds of metals or the usage or sizes of laminated materials, it is preferable that the metal substrate has the thickness of 0.10 to 0.50 mm.

It is more preferable that the metal substrate has the thickness of 0.10 to 0.30 mm when the metal substrate is the surface processed steel sheet and has the thickness of 0.18 to 0.40 mm when the metal substrate is the light metal sheet.

An adhesive agent layer may be formed on the metal substrate before lamination.

The adhesive layer agent may preferably be an adhesive agent which exhibits the excellent adhesiveness to both of the metal substrate and the laminating film.

As the typical adhesive agent which exhibits the excellent adhesion to the laminating film and the excellent corrosion resistance, a phenolepoxy-based adhesive agent which is formed of resol type phenol aldehyde induced from various phenols and formaldehyde and bisphenol epoxy resin can be used.

The typical adhesive agent is particularly an adhesive agent which contains phenol resin and epoxy resin at a weight ratio of 50:50 to 5:95, particularly at a weight ratio of 40:60 to 10:90. It is preferable that the adhesive agent layer generally has a thickness of 0.3 to 5 μm.

[Heating Means]

Subsequently, the heating means 4 which is used as means for preheating the substrate 3 is explained.

As the heating means 4, for example, means such as the electric heating, the high frequency induction heating, the infrared rays heating, the blast furnace heating, the roller heating and the like can be used. However, the present invention is not limited to the above-exemplified heating means.

In preheating the substrate 3 using the heating means 4, assuming a melting point of the thermoplastic resin as Tm, it is preferable to preheat the metal substrate to a temperature of (Tm−80° C.) to (Tm+50° C.), and it is particularly preferable to preheat the metal substrate to a temperature of (Tm−50° C.) to (Tm+30° C.). When the preheating temperature is lower than the above-mentioned range, it is difficult to ensure the sufficient adhesive strength between the metal resin layer while, when the preheating temperature is higher than the above-mentioned range, the metal substrate is liable to be softened.

[T-die]

As the T-die 2 which is served for extruding the thermoplastic resin, any die which is generally used in the extrusion of resin such as a coat hanger type die, a fish-tail type die, a straight manifold type die or the like can be used. The thermoplastic resin is heated and mixed in an extruding machine at a temperature not less than the melting point of the thermoplastic resin and then is extruded through the T-die.

It may be possible to extrude the laminating film as a laminated film of a plural layers. In this case, extruding machines whose number corresponds to the number of resins which constitute the laminate films are used and the resin film is extruded using a T-die for forming a multi-layered film. The width of the T-die is generally set within a range of 0.3 to 2 mm. However, when the extruded resin film 1 is used as can material or the like so that the film 1 is to be laminated after being stretched in the longitudinal direction to form a thin film having a thickness of approximately several $\mu$m to approximately 50 $\mu$m, it is preferable to set the width of the T-die within 0.3 to 0.8 mm to perform the stable lamination by suppressing the stretching ratio to a value not more than a predetermined value.

It is necessary to determine the length of the T-die (extruding width of the resin film 1) such that the width of the flattened portion 11 becomes wider than the necessary width of a product while taking a neck-in quantity and the width of thick portions (ear portions 12) formed at both ends of the film due to a neck-in phenomenon into consideration.

[Thermoplastic Resin]

The thermoplastic resin which is extruded from the T-die according to the present invention is not particularly limited provided that the thermoplastic resin is extrudable and has the film formability. For example, any one of polyolefin formed of random of some $\alpha$-olefin or block copolymer such as low-density polyethylene, high-density polyethylene, polypropylene, polyl-butene, poly4-methy-1-pentene or ethylene, propylene, 1-butene, 4-methyl-1-pentyne, ethylene vinyl compound copolymer such as ethylene vinyl acetate copolymer, ethylene vinyl alcohol copolymer, ethylene vinyl chloride copolymer, styrene-based resin such as polystyrene, acrylic nitrile styrene copolymer, ABS, $\alpha$-methylstyrene styrene copolymer, polyvinyl chemical compound such as polyvinyl chloride, polyvinylidene chloride, vinyl chloride vinylidene copolymer, polymethyl acrylate, polymethyl methacrylate, polyamide such as nylon 6, nylon 6—6n, nylon 6–10, nylon 11, nylon 12, thermoplastic polyester such as polyethylene terephthalate, polybutylene terephthalate, polycarbonate, polyphenylene oxide or a mixture of these compounds can be used as the thermoplastic resin.

As the particularly preferable thermoplastic resin from a viewpoint of formability, the corrosion resistance and the like, thermoplastic polyester, the copolymer polyester, or a mixture of these resins, and a laminated body made of these resins are named. Among these resins, the polyester which is mainly formed of ethylene terephthalate units is preferably used.

When the polyester is used as raw material, although the polyethylene terephthalate per se can be used, it is preferable to introduce the copolymer ester units other than ethylene terephthalate in the polyester. This is because that the introduction of copolymer ester units can reduce the crystallization of the laminating film and it is desirable from a viewpoint of the shock resistance and the formability of the laminated material.

Further, it is also preferable to use the copolymer polyester which contains the ethylene terephthalate units as the major component and a small amount of other ester units and has a melting point of 210 to 252° C.

In general, in the copolymer polyester, it is preferable that not less than 70 mol % and particularly not less than 75 mol % of a dibasic acid component is constituted of a terephthalic acid component, 70 mol % and particularly not less than 75 mol % of a diol component is constituted of ethylene glycol, and 1 to 30 mol % and particularly 5 to 25 mol % of a dibasic acid component and/or diol component is constituted of a dibasic acid component other than terephthalic acid and/or a diol component other than ethylene glycol.

As the dibasic acid other than the terephthalic acid, one kind or a combination of two or more kinds of aromatic dicarboxylic acid such as isophthalic acid, phthalic acid or naphthalene dicarboxylic acid, alicyclic dicarboxylic acid such as cyclohexane dicarboxylic acid, and aliphatic dicarboxylic acid such as succinic acid, adipic acid or sebacic acid or dodecanedioic acid can be named. As the diol component other than ethylene glycol, one kind or a combination of two or more kinds of propylene glycol, 1,4-butanediol, diethylene glycol, 1,6-hexylene glycol, cyclohexane dimethanol, and an ethylene oxide adduct of bisphenol A are named.

With respect to the combination of these comonomers, it is necessary to set the melting point of the copolymer polyester within the above-mentioned range.

Further, it is also possible to use a polyfunctional comonomer such as trimellic acid, pyromellitic acid, pentaerythritol in combination with the above-mentioned combination of copolymer.

To enable the polyester resin to have the molecular weight sufficient to form the film, it is preferable to set the intrinsic viscosity (I.V.) of the polyester resin within a range of 0.55 to 1.9 dl/g, and particularly within a range of 0.65 to 1.4 dl/g.

For example, it may be possible to suitably blend amino resin or epoxy resin into the above-mentioned thermoplastic resin in addition to an age resistor, a modifier and pigment, for example, when necessary. However, the present invention is not limited to the above-mentioned exemplified materials and agents.

To conceal the metal substrate or to facilitate the transmission of a wrinkle suppression force to the metal substrate at the time of drawing and redrawing for forming, the laminating film may contain an inorganic filler (pigment).

Further, an anti-blocking agent such as amorphous silica, various kinds of electrification prevention agents, a lubricant, an oxidation prevention agent, an ultraviolet-ray absorption agent and the like may be blended into the laminating film.

As the inorganic filler, an inorganic white pigment such as rutyle type or anatase type titanium oxide, zice flower or gloss white, a white extender such as barytes, settlable sulfuric acid barytes, calcium carbonate, gypsum, settlable silica, aerozol, talc, baked or unbaked clay, barium carbonate, alumina white, synthetic or natural mica, synthetic calcium silicate or magnesium carbonate, a black pigment such as carbon black or magnetite, a red pigment such as red iron oxide, a yellow pigment such as shellac varnish, and a blue pigment such as ultramarine blue or cobalt blue can be named.

It is preferable that the inorganic filler is blended into the thermoplastic resin at a rate of 10 to 500 weight % per 100 weight % of resin and more particularly at a rate of 10 to 300 weight % per 100 weight % of resin.

The film formed of the above-mentioned thermoplastic resin may be either a single layer film or a plural layer film.

A multilayered film is formed by using a T-die for forming a multilayered film.

[Cutting Means]

As shown in FIG. 1, the resin film 1 which is extruded from the T-die 2 is cut by the cutting means 50 at cutting positions 25 and is separated into the laminating film 10 having the flattened portion 11 and the ear portions 12 having a large thickness.

As the cutting means 50, for example, various means including physical means such as means which forms cuts in the resin film 1 using knives or means which sprays a water jet to the resin film 1, means for melting resin by locally heating the resin film 1 using a narrowly focused hot blast or a flame of a heating burner, means for forming cuts by bringing heater lines of electric heating into contact with the resin film 1, means for forming cuts using an ultrasonic cutter, means for irradiating laser beams can be used. However, the laser beams can focus a spot thereof on the resin film 1 in a non-contact manner so that the influence given to the resin is extremely small whereby it is desirable to use the laser beams.

When the laser beams are used, although the kind thereof is not specifically defined, a $CO_2$ gas laser is preferable from a viewpoint of the compactness, the price and the like of the device.

The $CO_2$ gas laser has the wavelength of 10.6 μm which is close to the absorption band (5 μm) of the thermoplastic resin and hence, the $CO_2$ gas laser exhibits the favorable heat absorption efficiency. Although a YAG laser can be used, there has been a problem that the device becomes large-sized.

The cutting positions 25 at which the ear portions 12 of the resin film 1 extruded from the T-die 2 are cut must be determined such that the ear portions 12 can be cut before lamination when the temperature of the resin film 1 is still at the high state.

As mentioned previously, in general, when the resin film is extruded, the neck-in phenomenon is liable to be generated. The neck-in phenomenon is a transitional state in which the local thickening of the resin film 1 at both widthwise end portions thereof and the contraction which changes the entire length in the widthwise direction are generated from a high-temperature molten state right after the resin film 1 is extruded from the T-die 2 to a state in which the temperature is lowered and the resin film 1 is solidified. In such a neck-in phenomenon, the thickening of both end portions tends to occur right below the T-die 2 immediately after the extrusion. Compared to the change of length in the widthwise direction, the thickening tends to occur in the high-temperature state.

By cutting the ear portions 12 of the resin film 1 in the midst of the progress of the neck-in phenomenon before lamination, as shown in FIG. 1, the width of the cut openings 27 can be widened by making use of the contraction effect of the resin film 1 in the widthwise direction so that the resin film 1 can be cut with less energy and, at the same time, a particularly advantageous effect of the present invention that the reuniting of the flattened portion 11 and the ear portions 12 can be prevented is obtained. Accordingly, it is sufficient for the cutting positions 25 to be set in the course of the neck-in phenomenon after the resin film 1 is extruded from the T-die 2 and before the resin film 1 is inserted into the nip portion between the lamination rolls 6a, 6b. However, it is particularly preferable to perform the cutting of the resin film 1 in the state where only the above-mentioned contraction force in the widthwise direction remains in the resin film 1 from a viewpoint of obtaining the opening widening effect after cutting and preventing the further local thickening of both end portions of the laminating film 10 after cutting. Although it will be explained later, when the pre-roll 5 is provided, the cutting may be performed right above the pre-roll 5.

The ear portions 12 of the resin film 1 which are cut and become unnecessary can be removed using suitable means such as suction means, winding means or gas blow-off means.

Here, before the lamination of the resin film 1 to the substrate 3, the ear portions 12 of the resin film 1 are cut and, at the same time, the flattened portion 11 is cut to form a plurality of strips of laminating films 10 and, thereafter, a plurality of strips of cut laminating films 10 can be laminated to the substrate 1. In this case, the laminated material 7 which is formed by laminating a plurality of laminating films 10 which are spaced apart from each other in the longitudinal direction of the substrate 3 can be formed.

Subsequently, the summary of a laser beam irradiation device 50 when $CO_2$ laser beams are used as the cutting means 50 is explained hereinafter in conjunction with FIG. 4 and FIG. 5.

Figure 4:
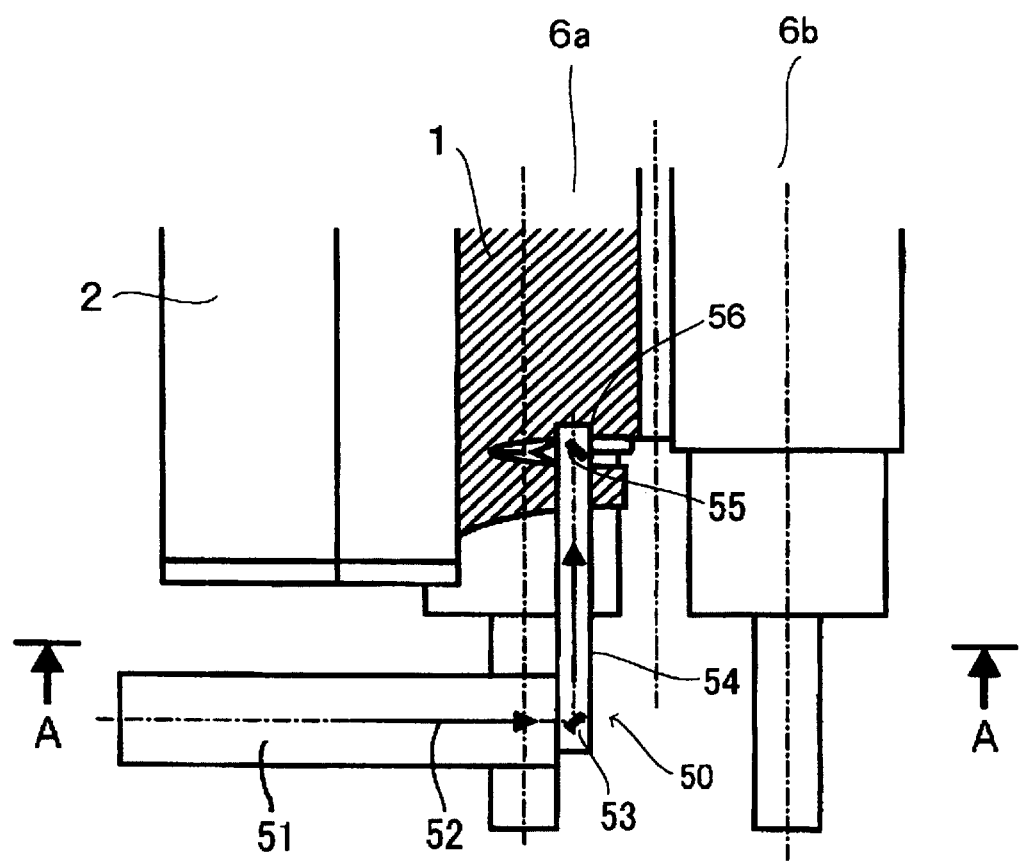
FIG. 4 is a schematic explanatory view for explaining the summary of a laser beam irradiation device.

FIG. 4 is a plan view showing a state in which the laser beam irradiation device 50 is mounted on the lamination roll 6a and the resin film 1 is cut by the laser beam irradiation device 50. FIG. 5 is a cross-sectional view taken along a line A—A in FIG. 4.

Figure 5:
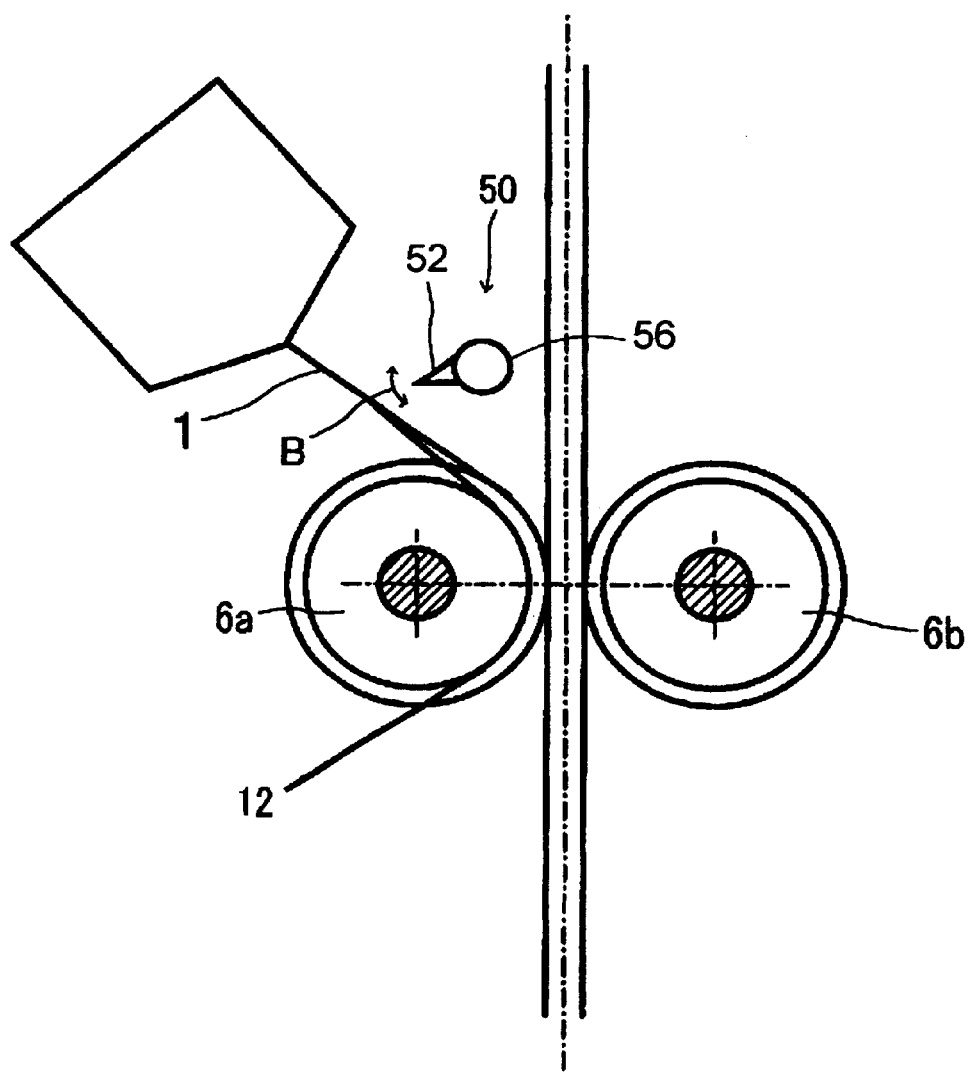
FIG. 5 is a schematic explanatory view for explaining the summary of a laser beam irradiation device.

In FIG. 4 and FIG. 5, laser beams 52 oscillated from a laser oscillator 51 have a direction thereof bent in the axial direction of the lamination roll 6a by a reflection mirror 53 and are guided to a laser beam guide part 54. Then, the laser beams 52 are bent in the direction toward the resin film 1 by a reflection mirror 55 which is mounted on a distal end of the laser beam guide portion 54 and pass through a focusing lens (focal length being changeable in an arbitrary manner) and the focused laser beams are irradiated to the cutting position 25 from a laser irradiation part 56.

The laser irradiation part 56 is provided tiltably in an upward and downward direction in a direction of an arrow B (see FIG. 5) so that the irradiation angle of the laser beams can be changed in an upward and downward direction along the flow of the resin film 1.

Further, laser beam guide part 54 has a longitudinally telescopic constitution such that the length of the laser beam guide part 54 can be changed. That is, the laser irradiation part 56 mounted on a distal end of the laser beam guide part 54 can be moved in the axial direction of the lamination roll 6a. Accordingly, the laser beam irradiation position can be changed also in the widthwise direction of the resin film 1 so that, along with the above-mentioned tiltable movement of the laser irradiation part 56, the cutting position 25 can be set freely in the upward and downward direction as well as in the leftward and rightward direction. Further, the cutting position 25 can be moved by the automatic manipulation from the outside.

Although the cutting means 50 is illustrated with respect to one side of the resin film 1 in FIG. 4 and FIG. 5, the cutting means 50 is also arranged at the opposite end portion of the resin film for cutting the opposite end portion so as to cut both end portions of the resin film 1.

Further, when the pre-roll 5 which will be explained hereinafter is provided, it is preferable to set the cutting means 50 at the cutting positions 25 immediately behind the resin film 1 which is made to flow out from the pre-roll 5.

[Pre-roll]

Figure 6:
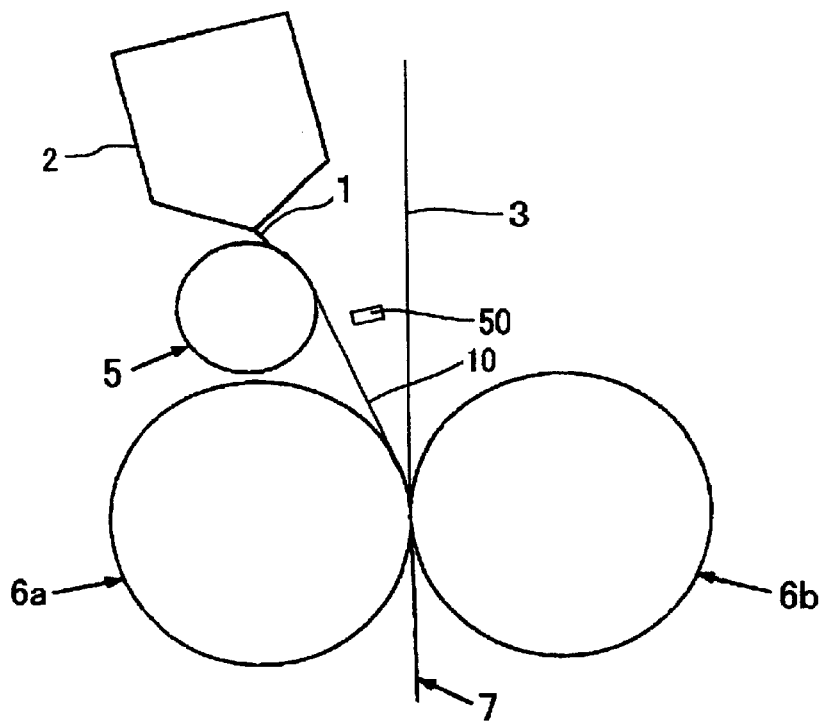
FIG. 6 is a schematic view showing the arrangement of pre-rolls.

As shown in FIG. 6, the pre-roll 5 is disposed right below the T-die 2 so that the resin film 1 which is extruded from the T-die 2 can be temporarily received by the pre-roll 5 and thereafter can be transported to the lamination rolls 6a, 6b.

That is, between the T-die 2 and the lamination rolls 6a, 6b, the pre-roll 5 which temporarily receives the resin film 1 formed by extruding the molten resin over a full width thereof is disposed independently from the lamination rolls 6a, 6b.

With the provision of the pre-roll 5, it becomes possible to obtain two operation-and-effects which are confronted with each other, that is, the fast cooling to stabilize the resin film 1 and the holding of high temperature to ensure the adhesive strength.

Accordingly, the range of selection for the resins which are applicable to the extrusion can be broadened so that the resins in the wide range can be laminated to the substrate.

Although FIG. 6 shows the case in which the pre-roll 5 is arranged at one side of the substrate 3, when laminating films are laminated to both sides of the substrate 3, it is preferable to arrange the pre-rolls at both sides of the substrate 1.

In the present invention, as the pre-roll 5, a metal roll whose whole surface is mirror-finished with chromium plating can be used.

In place of the metal roll, a pre-roll which provides a heat-insulation rubber layer on the whole surface thereof can be used. To the whole surface of the rubber layer, a tube which is made of inert resin such as fluororesin may be coated by adhesion. Still further, a pre-roll which forms a heat insulation ceramic layer on the whole surface of the roll can be also used.

Figure 7:
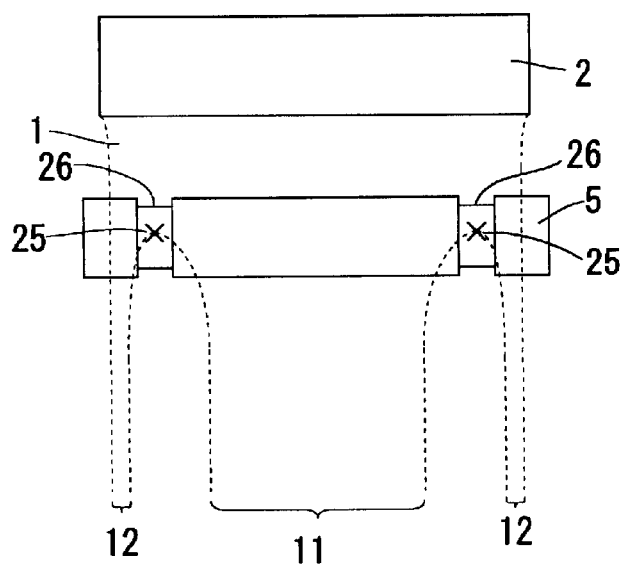
FIG. 7 is an explanatory view showing a slit-like groove portion formed in the pre-roll.

As shown in FIG. 7, it is preferable that slit-like groove portions 26 are formed in the pre-roll 5 used in the present invention at positions slightly close to the inner side from both axial end portions of the pre-roll 5.

From the resin film 1 extruded from the T-die 2, the ear portions 12 are cut by setting positions disposed above portions of the pre-roll 5 where the slit-like groove portions 26 are formed as the cutting positions 25 indicated by x. Since the slit-like groove portions 26 are formed below the cutting positions 25, it becomes possible to prevent the pre-roll 5 from being injured by the cutting means 50.

Further, since the flattened portion 11 obtained by cutting the resin film 1 is held by the center portion of the pre-roll 5, the resin film 1 can be surely separated into the flattened portion 11 and the ear portions 12 on the pre-roll 5.

It is preferable that the depth of the slit-like groove portions 26 of the pre-roll 5 are, in generally, set to approximately 0.1 to 3 mm. Further, it is preferable that the pitch of the grooves in the axial direction is set to 1 to 10 mm.

[Lamination Rolls]

In the present invention, it is preferable that the lamination rolls 6a, 6b have the same shape and are formed of the same material as lamination rolls described in Japanese Laid-open Patent Publication 100006/1999.

It is preferable that the lamination rolls are formed of resilient body rolls which have surfaces thereof formed of resilient bodies. That is, with the use the resilient body rolls, the lowering of temperature due to the heat conduction can be prevented. At the same time, a fixed nip width (width in the roll circumferential direction) can be formed assuredly between the formed laminated material and the rolls by making use of the cushion performance and the resiliency of the resilient body rolls. This assurance of the fixed nip width is effectively useful for enhancing the adhesion between the substrate 3 and the laminating film 1.

Further, with the use of the resilient body rolls, the pressing force generated by the rolls is uniformly transmitted to the entire width of the substrate 3 so that the laminated material 7 having the thickness of the laminating film 10 set uniform in the widthwise direction and the adhesive strength of the laminating film 10 set substantially constant in the widthwise direction can be formed.

When the resilient body roll is used as the pre-roll or the lamination roll, it is preferable that the resilient body (rubber) which constitutes the resilient body roll is formed of rubber having the excellent mold releasing ability and the excellent heat resistance. Although silicone rubber (Q) and fluororubber (FKM) are named as such rubber, the fluororubber is particularly preferable. Further, when the fluororesin tube having the heat contraction performance is used, it is preferable to use the silicone rubber from a viewpoint of adhesiveness between the rubber and the fluororesin tube.

The fluororubber rubber exhibits the heat resistance in common. As typical examples, the fluoric vinylidene based fluororubber, tetrafluoroethylene-hexafuluoropropylene based fluororubber, tetrafluoroethylene-perfluoromethyvinylidene based fluororubber, fluorosilicone based fluororubber and fluorophosphazene based fluororubber can be named. It is needless to say that the fluororubber is not limited to these examples.

As the silicone rubber, silicone rubber which contains polydimethysiloxane, polymethyphenyl siloxane, polydipheny siloxane or the like as constituent units can be used.

These rubbers are used together with a reinforcing agent or a filler such as carbon black or white carbon when necessary.

It is preferable that the hardness of the using resilient body (JIS) is generally set within 50° to 90°, and more particularly within 60° to 90° and the thickness of the resilient body layer is set within the range of 1 to 30 mm.

[Stepped Portion of Lamination Roll]

To make portions of the lamination rolls 6a, 6b which correspond to the cut ear portions 12 surely hold the ear portions 12, it is preferable to form stepped portions 16 which have a diameter slightly smaller than the diameter of the lamination roll on both end portions of the lamination roll 6a, 6b.

Due to the formation of the stepped portions 16, it becomes possible to make only the flattened portion 11 of the resin film 1 laminated to the substrate 3 so that the cut ear portions 12 can be transported to the stepped portions 16 whereby the ear portions 12 can be surely separated and removed.

Figure 8:
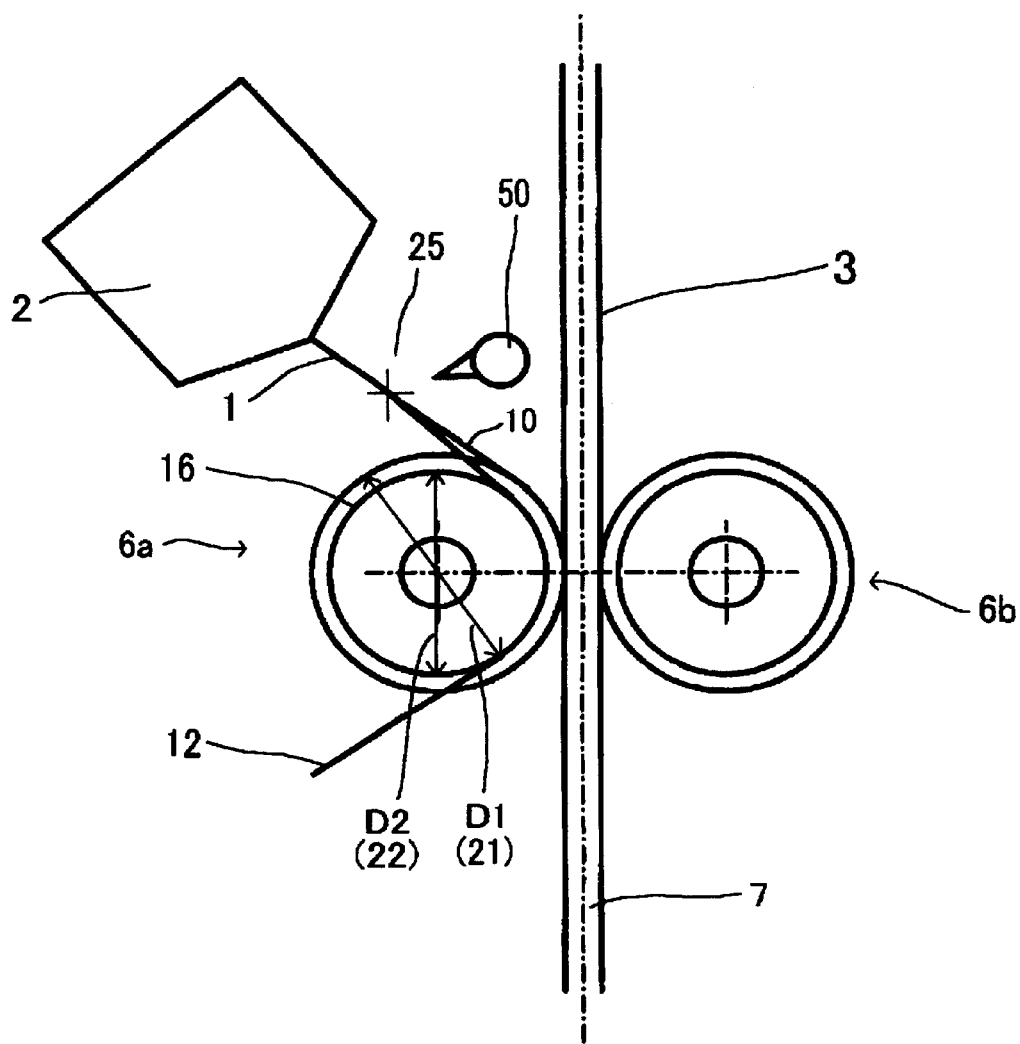
FIG. 8 is a schematic explanatory view for explaining a lamination roll having stepped portions.

That is, FIG. 8 shows an example of the shape of the lamination rolls 6a, 6b which are used in the present invention. The lamination rolls 6a, 6b have large-diameter portions 21 at axially center portions thereof and small-diameter portions 22 at both axially end portions 22.

Figure 10:
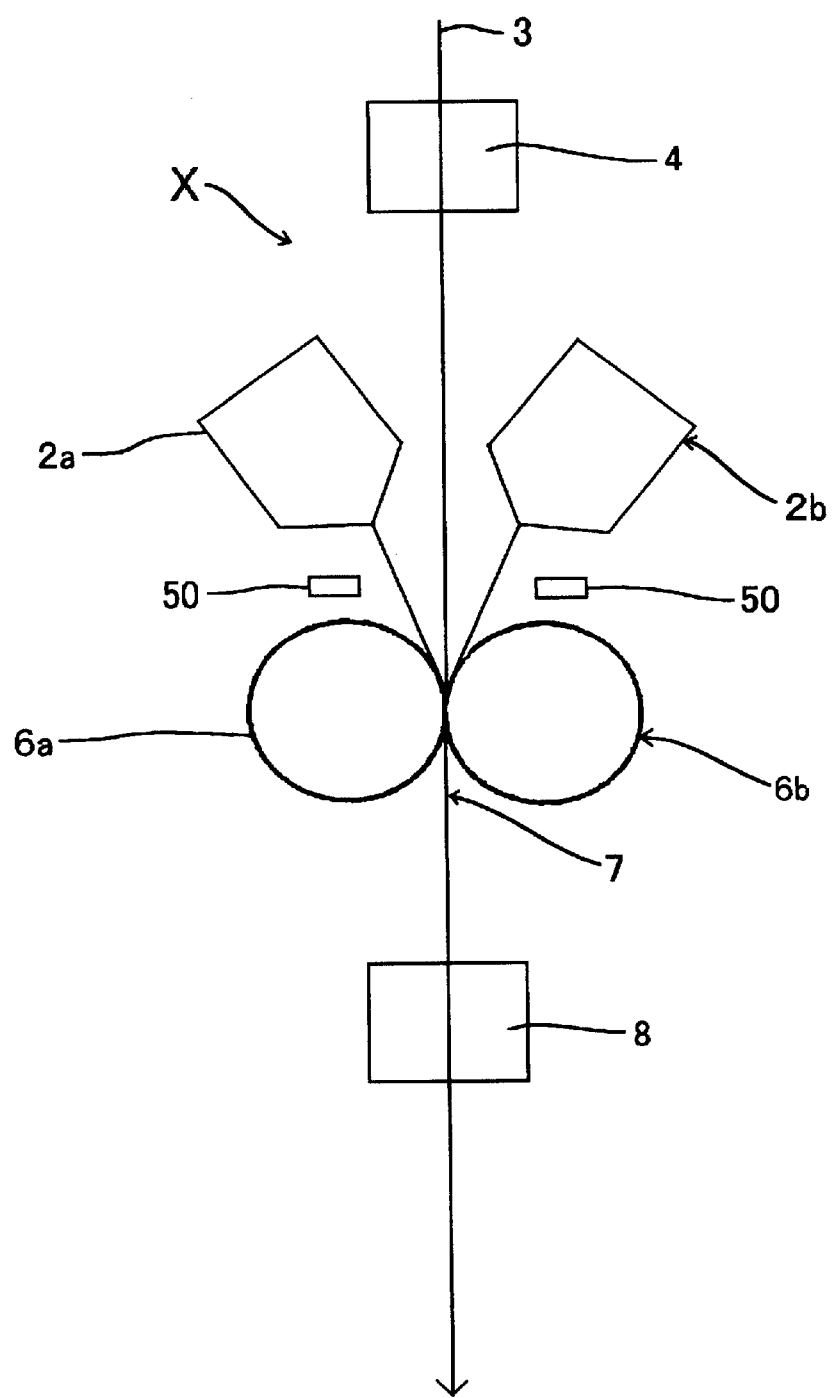
FIG. 10 is a schematic explanatory view for explaining a case in which laminating films are laminated to both surfaces of a substrate.

With the use of the lamination rolls provided with the stepped portions 16, it becomes possible to make the small-diameter portions 22 of the lamination rolls receive the ear portions 12 of the cut resin film 1 and the large-diameter portion 21 receive the flattened portion 11 of the resin film 1. Accordingly, the advancing directions of the laminating film 10 and the ear portions 12 after cutting can be made different from each other so that the separation of the ear portions 12 can be surely performed and the lamination of the flattened portion 11 can be surely performed. Further, when the resin films 1 are laminated to both surfaces of the substrate 3 as shown in FIG. 10, by making the respective small-diameter portions 22 receive respective ear portions 12, the removal of the ear portions 12 can be surely performed while preventing the ear portions 12 and the laminating film 10 from adhering to each other.

Although the step difference between the large-diameter portion 21 (diameter: D1) and the small-diameter portion 22 (diameter:D2), that is, (D1–D2) /2 may differ depending on the diameter D1 of the lamination roll and the thickness of the resin film 1, particularly the thickness of the ear portions 12, to ensure the reliable holding of the ear portions 12, it is preferable that the step difference is set within 0.05 to 50 mm. It is more preferable that the step difference is set within 5 to 20 mm.

That is, when the step difference is less than the above-mentioned 0.05 mm, it is difficult to separate the ear portions 12 from the laminating film 10 and there exists the high possibility that the cross sections of the ear portions 12 which are once separated are again united to the corresponding cross sections of the laminating film 10.

On the other hand, when the step difference exceeds the above-mentioned 50 mm, the force is applied to the cut portions 25 in an unstable direction and hence, it is difficult to obtain the sharp cutting edges of the laminating film 10.

Although the surface shape of the stepped portions 16 is not particularly limited, it is generally preferable that the surfaces of the stepped portions 16 have a coarse surface.

Further, to perform the efficient cooling and solidification (temperature-controlled cooling being preferable) of the ear portions 12, it is preferable to make the stepped portions 16 have metal surfaces.

Further, in place of the stepped portions, suction holes may be formed at both end portions of the lamination roll and the cut ear portions 12 may be sucked by these suction holes thus separating the cut ear portions 12 from the laminating film 10.

Further, by simply using or by combining the blowing of air to both end portions of the lamination roll so as to press the ear portions 12 and the action to attract the ear portions 12 to both end portions of the lamination roll using static electricity, the cut ear portions 12 can be separated.

Figure 9:
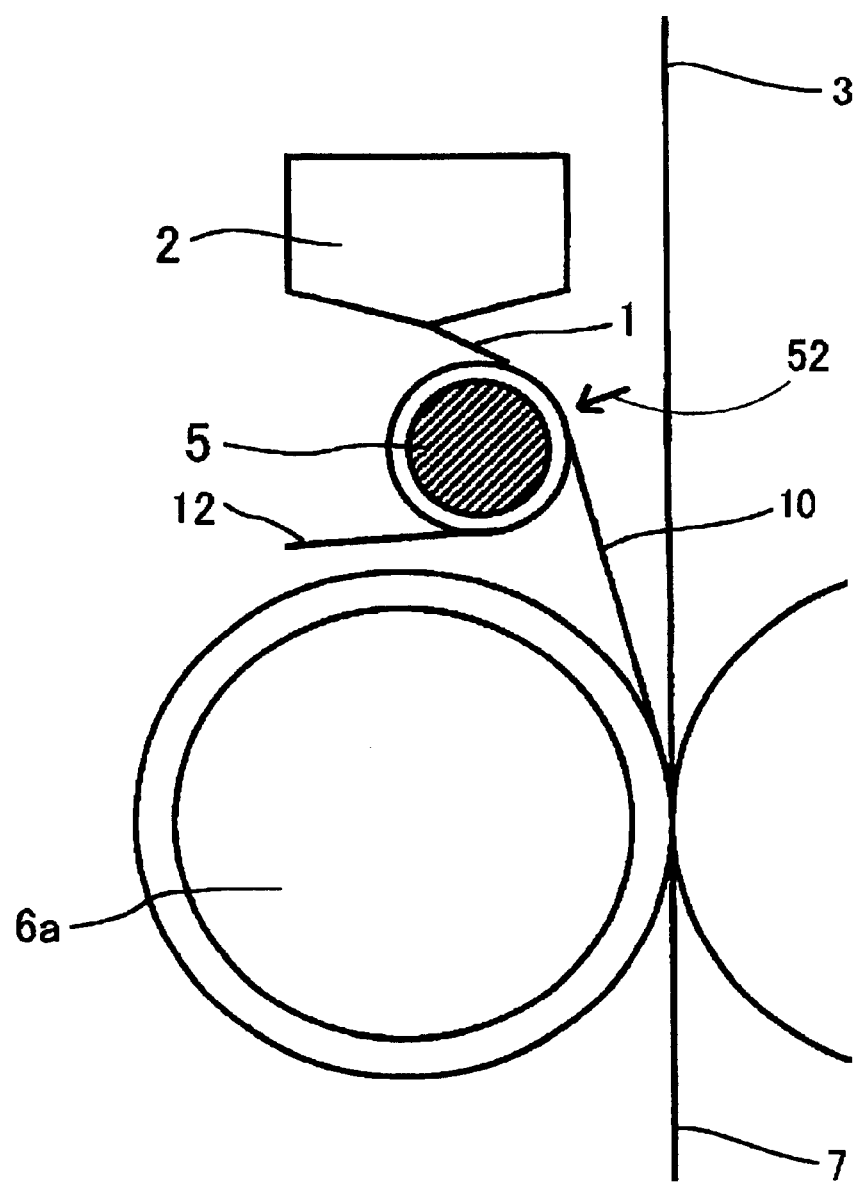
FIG. 9 is a schematic explanatory view for explaining a case in which the separation of ear portions is performed using the pre-roll.

When the pre-roll 5 is provided as shown in FIG. 9, the above-mentioned separation action of the ear portions 12 can be also performed by using the pre-roll 5. In this case, the removal of the ear portions 12 by the lamination roll 6*a* becomes no more necessary.

Although the lamination rolls 6*a*, 6*b* may be formed of lamination rolls having a function of cooling the laminated material, warm lamination rolls can be used in the present invention.

"Warm" is a concept which belongs to an intermediate zone between "cold" and "hot" and is higher than room temperature and lower than a melting point of thermoplastic resin.

By holding the temperature of the lamination rolls at the warm zone, the rapid transition of heat between the rolls and the resin which is brought into contact with the rolls can be suppressed so that the heat that the preheated substrate 3 has and the heat that the molten and extruded resin has can be effectively used for heat adhesion.

According to the present invention, to prevent the occurrence of wrinkles on the laminating film 10 and to enhance the adhesion between the substrate 3 and the laminating film 10, it is preferable to use polyester as the molten thermoplastic resin and to maintain the temperature (T2° C.) of the laminating film 10 which is formed of the flattened portion 11 by cutting the resin film 1 at a temperature more than the glass transfer point (Tg) of polyester.

When the temperature (T2) becomes lower than the above-mentioned range, the wrinkles occur on the laminating film 10 so that the adhesion of laminating film 10 to the substrate 3 can be further decreased.

According to the present invention, it is preferable that the surface temperature of the lamination rolls 6*a*, 6*b* (to be more specific, the large-diameter portions 21) is set to a temperature higher than the room temperature and lower than a melting point (Tm) of thermoplastic resin, particularly 50° C. to (the melting point (Tm) of thermoplastic resin −30° C.).

The control of the surface temperature of the lamination rolls can be performed by allowing a liquid medium of a given temperature to pass through the rolls or by bringing back-up rolls whose temperature is controlled into contact with the lamination rolls or adopting other method.

Further, according to the present invention, to enhance the adhesion between the laminating films 10 and the substrate 3, it is preferable that the substrate 3 is fed in the direction substantially perpendicular to a line which connects the centers of a pair of lamination rolls.

When the substrate 3 is not fed in the perpendicular direction but is fed in the oblique direction, the substrate 3 is brought into contact with the lamination rolls at positions other than the nip portions and hence, the temperature of the substrate 3 is lowered and the adhesion between the laminating films 10 and the substrate 3 is lowered.

According to the present invention, it is preferable to laminate the laminating film 10 to the substrate 3 while maintaining the peripheral speed of the lamination rolls 6*a*, 6*b* at a speed which is 10 to 150 times larger than the extruding speed of the thermoplastic resin from the T-die 2, and more particularly, to 20 to 130 times larger than the extruding speed of the thermoplastic resin.

By setting the peripheral speed of the lamination rolls 6*a*, 6*b* within the above-mentioned range, the adjustment irregularities of the lip width or the like of the T-die 2 can be adjusted so that the laminating film 10 having more uniform thickness can be formed thus providing the more stable lamination. When the peripheral speed of the lamination rolls 6*a*, 6*b* is set to a value which exceeds the above-mentioned range, it gives rise to the rupture of the laminating film 10 and hence, such a setting of the peripheral speed is not desirable.

Further, when the peripheral speed of the lamination rolls 6*a*, 6*b* is set to a value which is lower than the above-mentioned range, not only the stable lamination is not ensured, but also the it becomes impossible to form the laminating films 10 having the sufficiently thin thickness.

As an application to materials for cans, from a viewpoint of can formability and can characteristics, it is preferable that the ratio (tM/tR) between the thickness (tM) of the metal substrate 3 and the thickness (tR) of the laminating film 10 per one surface is set to 2 to 150.

Further, to obtain the firm adhesion between the metal substrate 3 and the laminating film 10, it is preferable to set the contact width at the nip portions of the lamination rolls 6*a*, 6*b* within a range of 1 to 50 mm.

When the nip width is smaller than the above-mentioned range, it is impossible to ensure the sufficient contact time with respect to the lamination rolls 6*a*, 6*b* and hence, the laminating films 10 suffer from the adhesion failure.

On the other hand, when the nip width is larger than the above-mentioned range, it is difficult to increase the nip pressure and hence, the laminated material 7 is excessively cooled during nipping and hence, the adhesive strength tends to be decreased. Accordingly, it is preferable to set the nip pressure within a range of 1 to 100 kgf.cm$^2$.

To ensure the above-mentioned nip width, it is also preferable that at least one of the lamination rolls is formed of a resilient body roll.

With respect to the laminated material after completion of the heat adhesion, to prevent the crystallization and the thermal deterioration, it is preferable to rapidly cool or quench the laminated material using a cooling device 8 after lamination.

The quenching can be performed by blowing cold air onto the laminated material, by spraying cold water onto the laminated material, by immersing the laminated material in cooling water or by bringing the laminated material into contact with cooling rolls or the like.

The present invention is applicable not only to the formation of the laminating film 10 on one surface of the metal substrate 3 but also to the lamination of the laminating films 10 to both surfaces of the metal substrate 3.

That is, as shown in FIG. 10, a preheated substrate 3 is fed in the direction substantially perpendicular to a line which connects the centers of a pair of lamination rolls 6a, 6b and a pair of T-dies 2a, 2b are arranged in substantially symmetry with respect to the arrangement of the substrate 3. Due to such a constitution, the laminating films 10 are laminated to both surfaces of the substrate 3 and the formed laminated material 7 is quenched by the cooling device 8. In this case, as has been described in conjunction with FIG. 6, it may be possible to provide a pair of pre-rolls below the T-dies 2a, 2b and in front of lamination rolls 6a, 6b such that the pre-rolls correspond to a pair of T-dies 2a, 2b.

Although the laminated material 7 is obtained in the above-mentioned manner, the obtained laminated material can be wound and stored when necessary.

[Experiment]

The present invention is explained in further detail in conjunction with a following experiment.

The resin film 1 made of isophthalic copolymer polyethylene terephthalate (PET/IA) having a melting point of 220° C. was extruded from the T-die 2 at a temperature of 220° C. The resin film 1 was extruded on the pre-roll 5 which is arranged between the T-die 2 and the lamination rolls 6a, 6b. In the course of the neck-in before lamination, ear portions 12 were cut using the $CO_2$ gas laser so as to form the laminating film 10 having a width which is narrower than a width of the substrate 3 by 1 mm at both end portions. Then, the laminating film 10 was inserted into the lamination rolls 6a, 6b so as to laminate the laminating film 10 to the substrate 3 made of TFS which was preheated to 245° C. at a speed of 100 m per minute, and thereafter, the laminated material was subjected to a quenching step by receiving water shower in the cooling device 8 thus manufacturing the resin-coated laminated material 7.

In the above-mentioned manufacturing process, the substrate 3 was fed in the direction substantially perpendicular to a line which connects the centers of a pair of lamination rolls 6a, 6b and was served for lamination. As a result, the laminating film having the uniform thickness was obtained and the thick winding was possible without displacement of the laminated material at the time of winding.

With respect to the laminated material 7 obtained in the above-mentioned manner, cuts were formed in a lattice pattern having an area extending 20 mm in the longitudinal direction as well as in the lateral direction using a commercially available cutter such that each section has a size of 2×2 mm. Then, a Scotch Brand Tape having a width of 25 mm (manufactured by Sumitomo 3M Ltd.) was adhered to the laminated material 7. Thereafter the tape was peeled off and a peel-off test was performed to test the adhesive strength of the tape. As a result, the peel-off rate was preferable, that is, not more than 10%.

Further, a wax-based lubricant was coated on the laminated material, a circular disc having a diameter of 150mmφ was punched, and a forming test in which the laminated material was drawn into a container having a diameter of 92 mmφ was performed.

As a result, the failure such as peeling-off does not occur also in the forming test so that the laminated material which exhibits favorable results in all properties was obtained.

According to the present invention, since the ear portions of the resin film extruded from the extruding machine can be removed and directly laminated to the substrate, the end-portion processing of the laminated material after lamination becomes no more necessary whereby the laminated material can be manufactured using the simple manufacturing steps.

The laminated material manufactured according to the present invention allows the thin laminating film having a uniform thickness to be firmly adhered to the substrate such as a metal sheet or the like. Accordingly, when the laminated material is used in the application for cans, the laminated material can withstand the forming working of large force at the time of forming cans.

Further, the laminated material which neatly aligns the end portions of the laminating film and the substrate can be efficiently produced in one step so that the laminating film having an arbitrary width can be formed on the substrate.

Still further, even when the simultaneous both-surface lamination is performed, the manufacturing method has a freedom that the widths of laminating resins on respective front and back surfaces can be separately determined.

What is claimed is:

1. A method for manufacturing laminated material which laminates a resin film formed by extruding molten thermoplastic resin from a T-die to a substrate, the method comprising:

a step in which a laminating film is formed by cutting ear portions of the resin film before lamination, and a step in which the laminating film is laminated to the substrate.

2. A method for manufacturing laminated material which laminates a resin film formed by extruding molten thermoplastic resin from a T-die to a substrate, the method comprising:

a step in which the resin film is temporarily received and held by a pre-roll, a step in which ear portions of the resin film are cut before lamination to form a laminating film, and a step in which the laminating film is laminated to the substrate.

3. A method for manufacturing laminated material which laminates a resin film formed by extruding molten thermoplastic resin from a T-die to a substrate, the method comprising:

a step in which ear portions of the resin film are cut from the resin film and a flattened portion is cut to form a plurality of strips made of laminating films before lamination, and a step in which a plurality of strips made of laminating films are laminated to the substrate.

4. A method for manufacturing laminated material according to any one of preceding claim 1 to 3, wherein the thermoplastic resin is made of polyester and a temperature of the resin film at the time of cutting is set equal to or more than the glass transfer point (Tg).

5. An apparatus for manufacturing laminated material comprising:

heating means which preheats a substrate, a T-die which extrudes molten thermoplastic resin as a resin film, cutting means which forms a laminating film by cutting ear portions of the resin film before lamination, lamination rolls which laminate the laminating film formed by cutting to the substrate, and a cooling device which quenches the formed laminated material.

6. An apparatus for manufacturing laminated material comprising:

heating means which preheats a substrate, a T-die which extrudes molten thermoplastic resin as a resin film, a pre-roll which temporarily receives the resin film which is extruded from the T-die.

cutting means which forms a laminating film by cutting ear portions of the resin film by lamination, lamination rolls which laminate the laminating film and the substrate, and a cooling device which quenches the formed laminated material.

7. An apparatus for manufacturing laminated material comprising:

heating means which preheats a substrate, a T-die which extrudes molten thermoplastic resin as a resin film, cutting means which forms a plurality of strips of laminating films by cutting ear portions of the resin film and also by cutting flattened portion before lamination, lamination rolls which laminate a plurality of strips of laminating films and the substrate, and a cooling device which quenches the formed laminated material.

8. An apparatus for manufacturing the laminated material according to any one of the preceding claims 5 to 7, wherein each lamination roll is formed of a lamination roll having stepped portions.

9. An apparatus for manufacturing the laminated material according to claim 5, wherein the cutting means is formed of laser beams.

10. An apparatus for manufacturing the laminated material according to claim 5, wherein means for irradiating laser beams is disposed above the lamination roll.

11. An apparatus for manufacturing the laminated material according to claim 5, wherein a pair of T-dies and cutting means are arranged in substantially symmetry with respect to a surface of the substrate and the laminating films are laminated to both surfaces of the substrate.

12. An apparatus for manufacturing the laminated material according to claim 6, wherein the cutting means is formed of laser beams.

13. An apparatus for manufacturing the laminated material according to claim 7, wherein the cutting means is formed of laser beams.

14. An apparatus for manufacturing the laminated material according to claim 8, wherein the cutting means is formed of laser beams.

15. An apparatus for manufacturing the laminated material according to claim 6, wherein means for irradiating laser beams is disposed above the lamination roll.

16. An apparatus for manufacturing the laminated material according to claim 7, wherein means for irradiating laser beams is disposed above the lamination roll.

17. An apparatus for manufacturing the laminated material according to claim 8, wherein means for irradiating laser beams is disposed above the lamination roll.

18. An apparatus for manufacturing the laminated material according to claim 9, wherein means for irradiating laser beams is disposed above the lamination roll.

19. An apparatus for manufacturing the laminated material according to claim 6, wherein a pair of T-dies and cutting means are arranged in substantially symmetry with respect to a surface of the substrate and the laminating films are laminated to both surfaces of the substrate.

20. An apparatus for manufacturing the laminated material according to claim 7, wherein a pair of T-dies and cutting means are arranged in substantially symmetry with respect to a surface of the substrate and the laminating films are laminated to both surfaces of the substrate.

21. An apparatus for manufacturing the laminated material according to claim 8, wherein a pair of T-dies and cutting means are arranged in substantially symmetry with respect to a surface of the substrate and the laminating films are laminated to both surfaces of the substrate.

22. An apparatus for manufacturing the laminated material according to claim 9, wherein a pair of T-dies and cutting means are arranged in substantially symmetry with respect to a surface of the substrate and the laminating films are laminated to both surfaces of the substrate.

23. An apparatus for manufacturing the laminated material according to claim 10, wherein a pair of T-dies and cutting means are arranged in substantially symmetry with respect to a surface of the substrate and the laminating films are laminated to both surfaces of the substrate.

* * * * *